O. CROSBY.
FORWARD AND REAR DRIVE FOR CAR TRUCKS.
APPLICATION FILED NOV. 16, 1909.

962,320.

Patented June 21, 1910.

Witnesses
Ward Stattknecht
J. A. Byington.

Inventor
Oliver Crosby
by Paul & Paul
Attorneys

UNITED STATES PATENT OFFICE.

OLIVER CROSBY, OF ST. PAUL, MINNESOTA, ASSIGNOR TO AMERICAN HOIST & DERRICK CO., OF ST. PAUL, MINNESOTA, A CORPORATION.

FORWARD AND REAR DRIVE FOR CAR-TRUCKS.

962,320.   Specification of Letters Patent.   Patented June 21, 1910.

Application filed November 16, 1909. Serial No. 528,388.

*To all whom it may concern:*

Be it known that I, OLIVER CROSBY, of St. Paul, Ramsey county, Minnesota, have invented certain new and useful Improvements in Forward and Rear Drives for Car-Trucks, of which the following is a specification.

The object of my invention is to provide an improved forward and rear truck drive for cars, which can be rendered operative or inoperative as desired, and through which the driving force can be easily and quickly transmitted to the car axles.

A further object is to provide a driving connection of very simple and durable construction and one which is easily accessible for examination or adjustment.

My invention consists generally in the arrangement and construction of parts hereinafter described and particularly pointed out in the claims.

Figure 1:
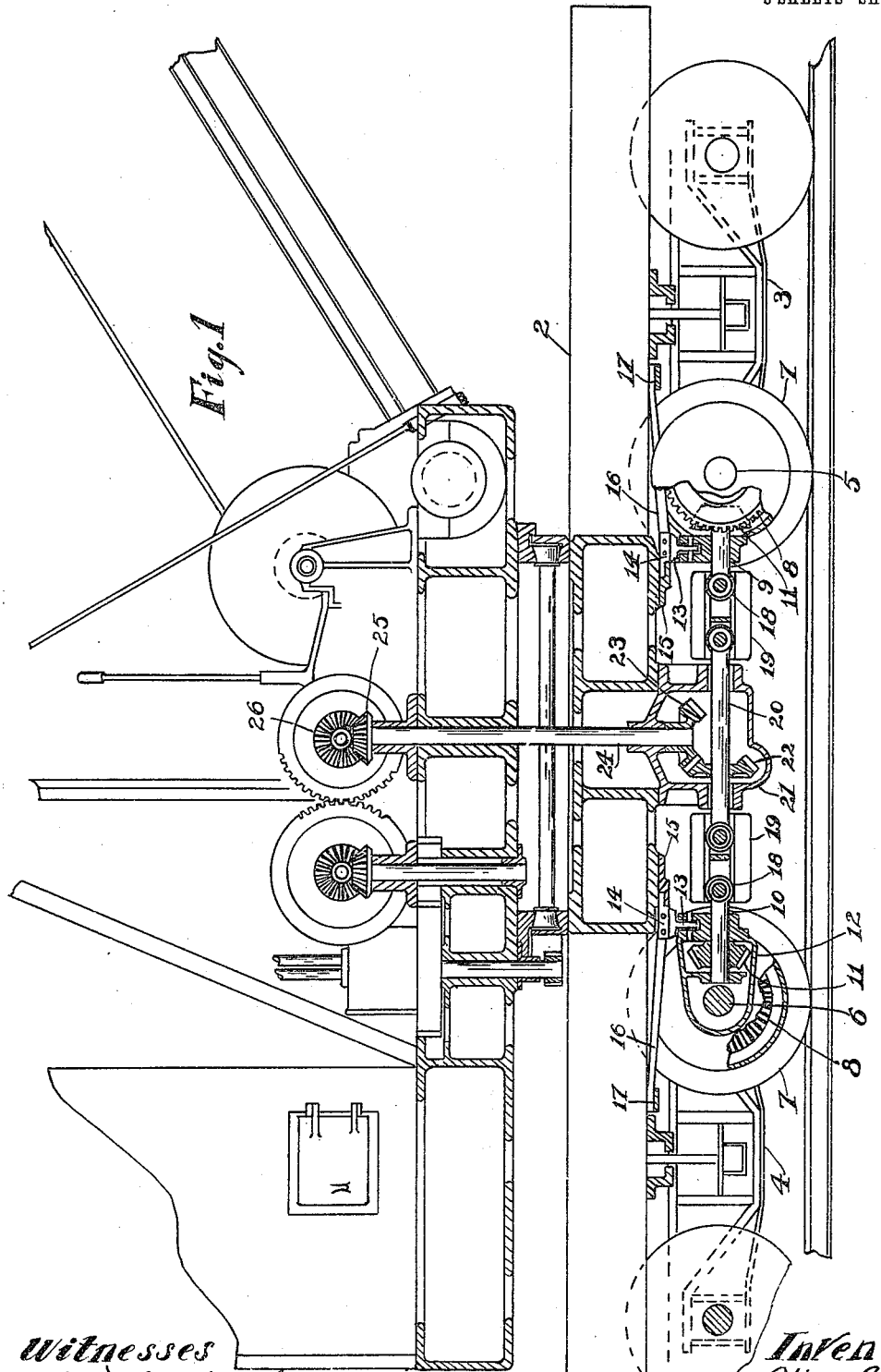
Figure 2:
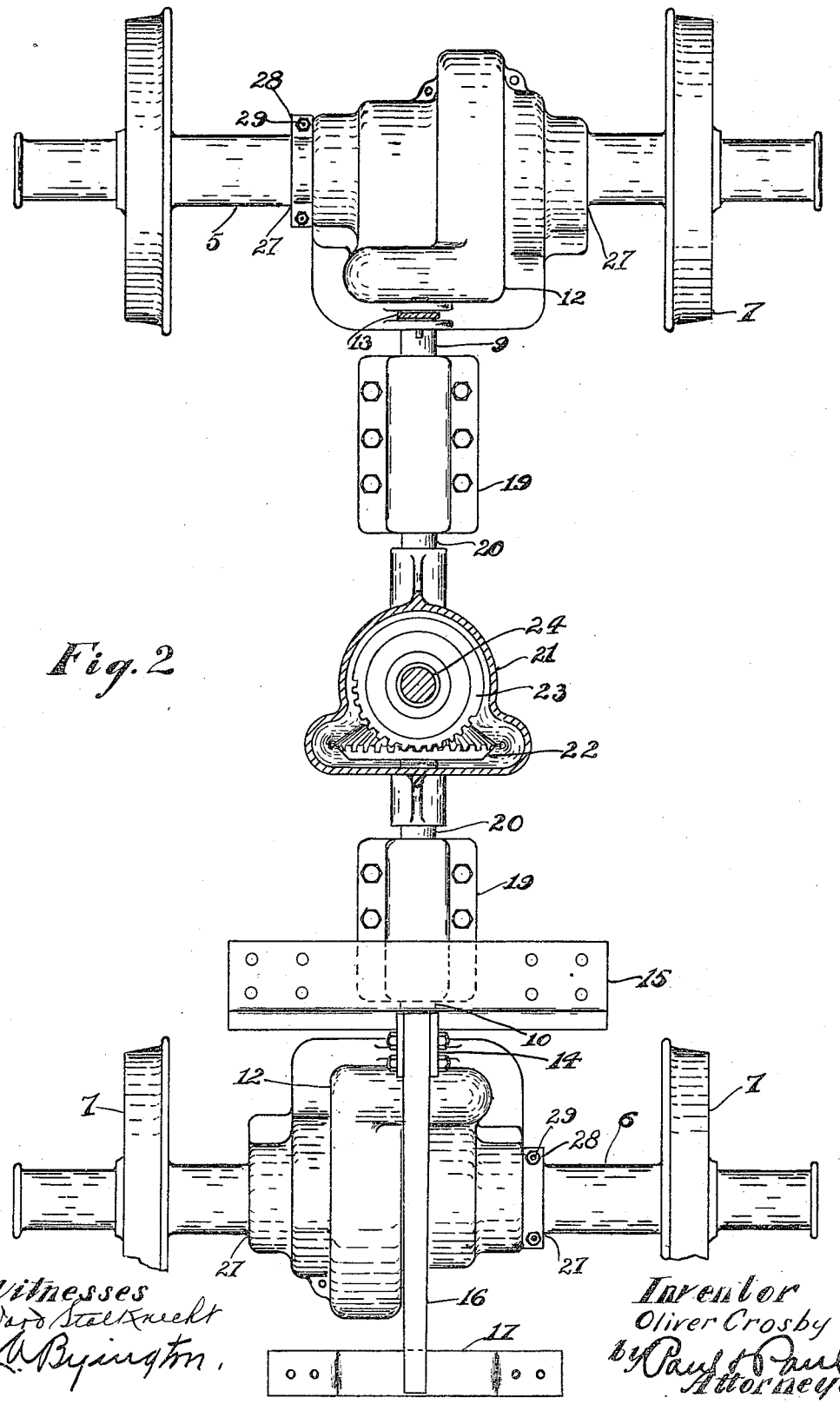
Figure 3:
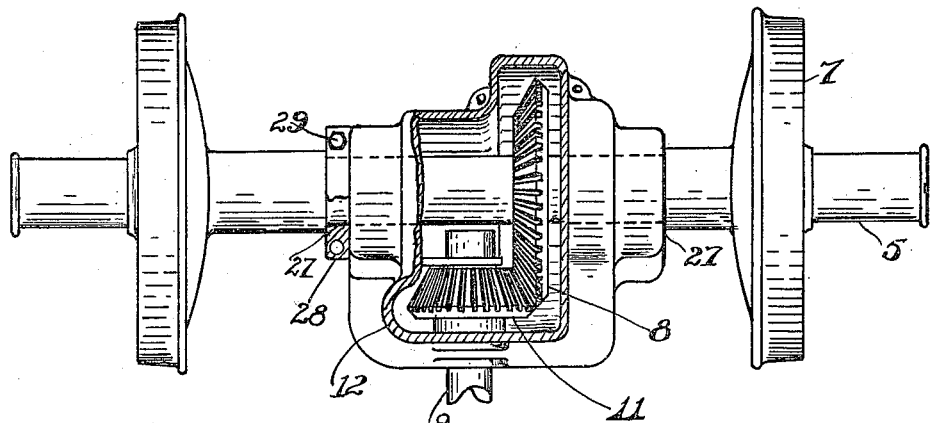
Figure 4:
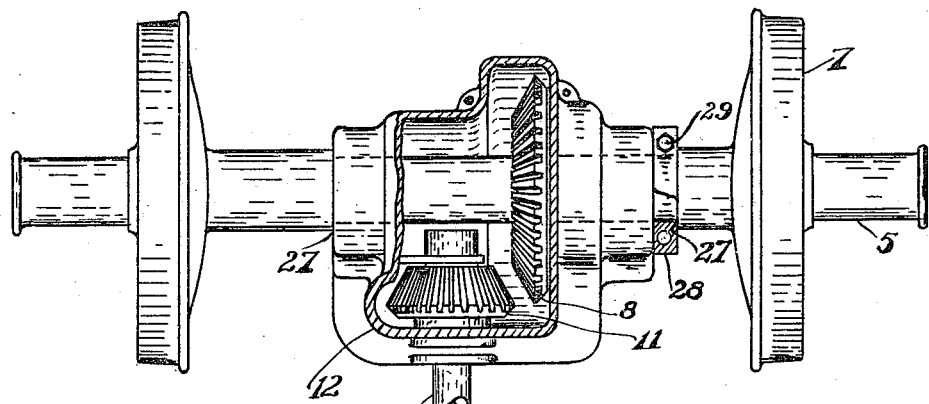
Figure 5:
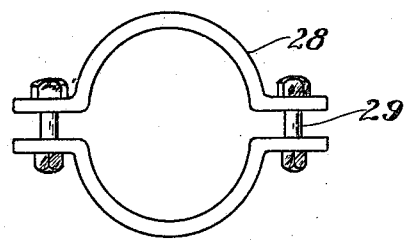

In the accompanying drawings forming part of this specification, Figure 1 is a vertical sectional view through a car with my invention applied thereto, Fig. 2 is a plan view, partially in section, illustrating the driving mechanism, Figs. 3 and 4 are detail views partially in section illustrating the means for rendering the gear operative or inoperative. Fig. 5 is a detail view of a split collar used on the car axle in connection with the gear casing.

This invention while applicable to cars generally, is designed particularly for use with those supporting a traveling crane, where the apparatus is used to pick up an object and convey it, perhaps, to a distant point, the car supporting the crane being moved back and forth over a track provided for the purpose. Obviously many advantages will arise from a driving connection with both the front and the rear trucks of the car. The driving force will be more evenly distributed and the traction increased. I do not, however, claim broadly the forward and rear driving connection, as such a means has been employed with vehicles of various types, though the connections have been more or less complicated. In my invention the application of the power is as direct as practicable and the connections involve the use of comparatively few parts, all of which are simple and accessible.

In the drawing, 2 represents a car having trucks 3 and 4 provided with axles 5 and 6 and wheels 7. These axles have gears 8 secured thereon. Short shafts 9 and 10 have gears 11 thereon, meshing with the gears 9 within cases 12, which are pivotally supported by hangers 13 from plates 14, which are slidable transversely in guides 15. Torsion rods 16 are secured to the plates 14 at one end, and have a sliding bearing at their other ends on bars 17. These torsion bars and their connections serve to hold up the gear cases and prevent the tendency of the gears from climbing up over the axle gears or moving down under them when power is applied to drive the car forward or backward. The shafts 9 and 10 have universal joint connections 18 within boxes 19 with a shaft 20 that is journaled in bearings in a casing 21 and has a gear 22 secured thereon. A gear 23, mounted on the lower end of an upright shaft 24, meshes with the gear 22, and said upright shaft has a beveled gear 25 at its upper end that is geared to a shaft 26 through which the power is transmitted to the car axles. The universal joints 18 allow the shafts 9 and 10 to accommodate themselves to the oscillation of the truck frames on curves in the track. The axle gears, as shown in Fig. 2, are located on opposite sides of the horizontal driving shaft and the casing of each gear has a longitudinal movement on its axle between shoulders 27 formed on the said axles on each side of the gear cases. (See Figs. 3 and 4.) The axle gears are fixed on the axles and consequently when the gear cases are moved to the left in Figs. 3 and 4, the cases and the pinions journaled therein on the shafts 9 and 10 will be moved out of engagement with the axle gears, rendering the drive temporarily inoperative when it is desired to put the car in a train for the purpose of moving it to some distant station or point. The gear cases are locked with the gears out of mesh by means of a split collar 28 that is adapted to encircle the axle between the gear case and the shoulder 27, being readily removable by means of the bolts 29 for adjustment from side to side of the gear case for the purpose of locking it with the gears in mesh or out of mesh. This arrangement forms a very simple and inexpensive means for throwing the gears into or out of mesh without the use of the usual complicated and expensive system of clutches.

I claim as my invention:—

1. The combination, with forward and rear truck axles, of gears secured thereto, shafts at right angles to said axles and having gears thereon meshing with the gears on said axles, gear cases for said shaft gears and hangers transversely movable with respect to said shafts and pivotally connected with said gear cases, a shaft intermediate to said gear shafts and having universal joint connections therewith, and a driving means for said intermediate shaft.

2. The combination, with the forward and rear truck axles and gears secured thereto, of shafts having gears thereon meshing with said axle gears, gear cases inclosing said shafts, hangers pivotally connected with said gear cases and slidable in guides, a shaft intermediate to said gear shafts and means for driving said intermediate shaft.

3. The combination in a car with forward and rear trucks and a frame carried thereby, of shafts geared to an axle of said trucks, hangers movable transversely of said car in guides thereon, torsion rods connected with said hangers and having sliding bearings on said car, gear cases inclosing said gears and pivotally connected with said hangers, and means for driving said shafts and gears.

4. The combination, with forward and rear truck axles, of gear cases mounted on said axles and movable a limited distance lengthwise thereon, means mounted on said axles for locking said cases against longitudinal movement thereon, shafts journaled in said gear cases and pinions on said shafts meshing with the gears on said axles, the adjustment of said gear cases allowing said pinions to be moved into and out of engagement with said axle gears, and means for driving said shafts.

5. The combination, with a truck axle having a reduced portion with shoulders at each end thereof, of a gear secured to said reduced portion, a gear case inclosing said gear and slidable on said reduced portion for a limited distance, means arranged to clasp said reduced portion between said case and one of said shoulders and lock said case in contact with the other shoulder, and a shaft journaled in said case and having a pinion meshing with said axle gear, said pinion being moved into and out of engagement with said axle gear by the adjustment of said case.

6. The combination, with a truck axle having a reduced portion with shoulders at each end thereof and a gear secured to said reduced portion, of a gear case slidable on said reduced portion and inclosing said gear, a removable collar fitting between said gear case and either one of said shoulders, a shaft journaled in said case and having a pinion meshing with said axle gear, the movement of said gear case on said reduced portion moving said pinion into and out of engagement with said axle gear, and the adjustment of said collar on one or the other side of said case locking it against the opposite shoulder and holding said pinion in mesh or out of mesh with said gear.

7. The combination, with a truck axle, of a gear secured thereon, a shaft arranged at right angles to said axle and having a gear meshing with the gear on said axle, a gear case slidably mounted on said axle and having a bearing for said shaft, said shaft and its gear being movable toward and from said axle gear by the movement of said gear case on said axle, and means mounted on said axle for locking said gear case against premature movement.

8. The combination, with a truck axle, of a gear secured thereon, a shaft arranged at right angles to said axle and having a gear meshing with the gear on said axle, a gear case slidably mounted on said axle and having a bearing for said shaft, said shaft and its axle being movable toward and from said axle gear by the movement of said gear case on said axle, and a removable collar mounted on said axle and adapted to lock said gear case against premature movement.

9. The combination, in a car with forward and rear trucks and a frame carried thereby, of shafts geared to an axle of said trucks, transversely movable hangers, torsion rods connected with said hangers, gear cases inclosing said gears and pivotally connected with said hangers, and means for driving said shafts and gears.

In witness whereof, I have hereunto set my hand this 17th day of November 1909.

OLIVER CROSBY.

Witnesses:
C. B. MORAN,
P. A. BRETSCHNEIDER.